United States Patent
Aisawa et al.

(10) Patent No.: US 8,571,037 B2
(45) Date of Patent: Oct. 29, 2013

(54) OPTICAL DIGITAL TRANSMISSION SYSTEM

(75) Inventors: Shigeki Aisawa, Yokosuka (JP);
Masahito Tomizawa, Yokosuka (JP);
Yutaka Miyamoto, Yokosuka (JP);
Yoshiaki Kisaka, Yokohama (JP);
Yasuyuki Endo, Yokohama (JP);
Katsuyoshi Miura, Yokohama (JP);
Kazuhito Takei, Yokohama (JP)

(73) Assignees: Nippon Telegraph and Telephone Corporation, Tokyo (JP); NTT Electronics Corporation, Yokohama (JP)

( * ) Notice: Subject to any disclaimer, the term of this patent is extended or adjusted under 35 U.S.C. 154(b) by 244 days.

(21) Appl. No.: 13/126,372

(22) PCT Filed: Nov. 13, 2009

(86) PCT No.: PCT/JP2009/006088
§ 371 (c)(1),
(2), (4) Date: Apr. 27, 2011

(87) PCT Pub. No.: WO2010/055677
PCT Pub. Date: May 20, 2010

(65) Prior Publication Data
US 2011/0262136 A1    Oct. 27, 2011

(30) Foreign Application Priority Data
Nov. 14, 2008 (JP) .................... 2008-292702

(51) Int. Cl.
*H04L 12/28* (2006.01)
(52) U.S. Cl.
USPC ..................... 370/395.51; 370/537
(58) Field of Classification Search
None
See application file for complete search history.

(56) References Cited

U.S. PATENT DOCUMENTS 6,920,149 B2 * 7/2005 Robledo et al. ............. 370/458
8,135,285 B2 * 3/2012 Kisaka et al. ............... 398/182

(Continued)

FOREIGN PATENT DOCUMENTS

JP 2008-503937 T 2/2008
JP 2008-113394 A 5/2008

(Continued)

OTHER PUBLICATIONS

ITU-T G.709/Y.1331 Series G: Transmission Systems and Media, Digital Systems and Networks—Interfaces for the optical network (OTN) (Mar. 2003).
ITU, Transport of IEEE 10Gbase-R in optical transport networks (OTN), ITU-% G-Series Recommendations—Supplement 43, ITU, Nov. 2006, p. 1-9.

*Primary Examiner* — Phirin Sam
(74) *Attorney, Agent, or Firm* — Harness, Dickey & Pierce, P.L.C.

(57) ABSTRACT

An optical digital transmission system of the present invention newly defines one second negative stuff byte in an overhead area for accommodation of the client signals with multiplexing into the OTU frame, newly defines one third positive stuff byte in a corresponding tributary slot in a payload area for accommodation of client signals with multiplexing, newly defines stuff control bits that is used for decision of the use of the second negative stuff byte and the third positive stuff byte in three different places in the overhead area for client signal accommodation with multiplexing, performs control by using the newly defined stuff control bits when accommodation of the client signal with the third positive stuff byte or the second negative stuff byte is required, and performs stuff control without using the newly defined stuff control bits when accommodation of the client signal by the third positive stuff byte and the second negative stuff byte is not required.

14 Claims, 13 Drawing Sheets

(56) References Cited

U.S. PATENT DOCUMENTS

| | | | |
|---|---|---|---|
| 2002/0012365 A1* | 1/2002 | Mueller | 370/536 |
| 2002/0018493 A1* | 2/2002 | Robledo et al. | 370/539 |
| 2005/0286521 A1 | 12/2005 | Chiang et al. | |
| 2007/0071443 A1* | 3/2007 | Fukumitsu et al. | 398/79 |
| 2008/0267223 A1 | 10/2008 | Meagher et al. | |
| 2009/0162061 A1* | 6/2009 | Kisaka et al. | 398/52 |

FOREIGN PATENT DOCUMENTS

| | | |
|---|---|---|
| JP | 2008-113395 A | 5/2008 |
| WO | 2006/009732 A1 | 1/2006 |
| WO | WO-2008/035769 A1 | 3/2008 |

* cited by examiner

| JC2 | JC1 | NJ02 | NJ01 | PJ01 | PJ02 | PJ03 | Interpretation |
|---|---|---|---|---|---|---|---|
| 00 | 00 | – | justification byte | data byte | data byte | data byte | no justification(0) |
| 00 | 01 | – | data byte | data byte | data byte | data byte | negative justification(-1) |
| 00 | 10 | – | justification byte | justification byte | data byte | data byte | double positive justification(+2) |
| 00 | 11 | – | justification byte | justification byte | data byte | data byte | positive justification(+1) |
| 01 | – | data byte | data byte | data byte | data byte | data byte | double negative justification(-2) |
| 11 | – | justification byte | justification byte | justification byte | justification byte | justification byte | triple positive justification(+3) |

FIG. 13

| JC [7,8] | NJO | PJO1 | PJO2 | Interpretation |
|---|---|---|---|---|
| 00 | justification byte | data byte | data byte | no justification(0) |
| 01 | data byte | data byte | data byte | negative justification(−1) |
| 10 | justification byte | justification byte | justification byte | double positive justification(+2) |
| 11 | justification byte | justification byte | data byte | positive justification(+1) |

OPTICAL DIGITAL TRANSMISSION SYSTEM

CROSS-REFERENCE TO RELATED APPLICATIONS

This application is a 371 U.S. National Stage of International Application No. PCT/JP2009/006088, filed Nov. 13, 2009. This application claims priority to Japanese Patent Application No. 2008-292702, filed Nov. 14, 2008. The disclosures of the above applications are incorporated herein by reference.

TECHNICAL FIELD

The present invention relates to an optical digital transmission system that accommodates client signals with multiplexing, and transmits the client signals.

Priority is claimed on Japanese Patent Application 2008-292702 filed on Nov. 14, 2008, the content of which is incorporated herein by reference.

BACKGROUND ART

In an optical transmission system, as a digital hierarchy for multiplexing an existing service signal, a synchronous digital hierarchy (SDH) has been internationally standardized.

In the United States, a synchronous optical network (SONET) having the same frame structure as the SDH has become an US national standard. An optical system that conforms to the SDH/SONET specification is the mainstream of a current optical transmission system and has been introduced all over the world. In recent years, an optical transport network (OTN) (for example see Non-patent Documents 1 and 2) has been standardized as a platform for transparently transmitting various clients such as an asynchronous transfer mode (ATM), an Ethernet (a registered trademark, hereinafter the same) as well as the SDH/SONET based on a wavelength division multiplexing technique that can cope with an explosive increase in Internet traffic. The optical transport network is expected to become the mainstream of a future optical transmission system.

Further, due to the explosive spread of the Internet, an Ethernet interface has abruptly increased, and in 2007, shipments of the Ethernet interface exceeded shipments of the SDH/SONET interface. As an Ethernet signal of a Giga class, a 1 Gigabit Ether (1 GbE) signal of 1.25 Gbit/s and a 10 Gigabit Ether (10 GbE) LAN PHY signal of 10.3125 Gbit/s have been standardized. In the future, as a client signal of a communication carrier, the 10 GbE is expected to be the mainstream. Further, a demand for connecting LAN environments located at remote sites through a LAY-PHY is increased.

As a method of satisfying the demand, on an OTN of a 10 Gb/s class, an OTU2e has been documented in ITU-T G.Sup.43 as a technique of mapping a 10 GbE-LAN PHY with an over-clocked OTU2 and transferring it and is being used as a de facto standard. In this case, the bit rate of the 10 GbE-LAN PHY is 10.3125 Gb/s±100 ppm, and the bit rate of the OTU2e is 11.096 Gb/s±100 ppm.

A configuration of a conventional transmission system and a frame structure of the OTN will be described with reference to FIG. 11. When a client signal S1 is input to an optical transmitter 4, an optical reception unit 41 receives the client signal. An OTU frame generation unit 42 converts the received signal to an OTU frame, and the OTU frame is transmitted through an optical transmission unit 43. When the OTU frame signal is transmitted along an optical transmission line 6 and input to an optical receiver 5, an optical reception unit 51 receives the OTU frame signal. A client signal extraction unit 52 extracts a client signal from the received signal, and the client signal is transmitted through an optical transmission unit 53. This signal is a client signal S2.

In the frame of the OTN, a stuff process control byte (hereinafter, a justification control (JC) byte) and a byte for stuff insertion at the time of a positive stuff (hereinafter, a positive justification opportunity (PJO) byte; a positive stuff byte) are defined in an overhead of an optical channel payload unit (OPU) inside an optical channel transport unit (OTU) frame. Further, a byte for stuff storage at the time of a negative stuff (hereinafter, a negative justification opportunity (NJO) byte; a negative stuff byte) is defined.

In asynchronous mapping accommodation in which a clock of the client signal is not synchronized with a clock of the OTN signal, a positive or negative stuff process corresponding to a frequency difference between the client signal and a signal of a payload portion of the OTN is performed, and accommodation into the OTN frame is performed. A frame of the G.709 standard assumes that a degree of bit rate accuracy of the client signal and a degree of bit rate accuracy of the signal at the OTN side are ±20 ppm, respectively. In the case of the OTU2e, since a clock of the 10 GbE-LAN PHY that is the client is synchronized with a clock of the signal at the OTN side, accommodation into the OTN frame can be performed without performing the stuff process.

FIG. 12 illustrates a frame structure at the time of optical channel data tributary unit (ODTU) multiplexing specified in ITU-T G.709. Columns 1 to 14 are an overhead of an optical channel transport unit (OTU) and an optical channel data unit (ODU), columns 15 and 16 are an overhead of an optical channel payload unit (OPU), columns 17 to 3024 are a payload of the OPU, and columns 3825 to 4080 are an error correction area. The OPU payload area is divided into 16 tributary slots (TSs). For example, in the case of mapping 4 ODU2 frames with an OPU3 frame of 40 G, multiplexing is implemented by dividing 16 TSs into four and allocating them to each ODU2.

In the G.709 frame, 1 byte (NJO) is prepared as a negative stuff byte, and 2 bytes are prepared as positive stuff bytes (PJO1 and PJO2). Thus, 3 stuff control bytes for supporting a stuff control status are prepared, and the stuff control status is controlled by a majority vote from the three bytes. FIG. 13 illustrates a definition of the G.709. For the JC bytes, a first row to a third row of a column 16 are set, and only 2 bits, a bit 7 and a bit 8, are defined. When the bit 7 and the bit 8 are "00," it means "no stuff". In the case of "01," it means "negative stuff", and in the case of "10," it means "double positive stuff". In the case of "11", it is assigned to "positive stuff". In FIG. 12, the positions of PJ01 and PJ02 change by a multi-frame alignment signal (MFAS) and the TS.

In the case of the frame structure illustrated in FIG. 12, it is possible to cope with a relative clock deviation from about −95 ppm to about +101 ppm by one negative stuff bit and two positive stuff bits. In this case, if a degree of clock accuracy at a network side and a stuff effect accompanied with multiplexing are excluded, a degree of clock accuracy at a client side is in a range of between −75 ppm and 81 ppm. In this case, it is difficult to accommodate the ODU2e signal having a degree of accuracy of ±100 ppm.

PRIOR ART DOCUMENT

Patent Document

[Non-patent Document 1] ITU-T G.709
[Non-patent Document 2] ITU-T G.Sup.43

DISCLOSURE OF INVENTION

Problem to be Solved by the Invention

In a wavelength division multiplexing (WDM) system of a 10 Gb/s class, on the 10 GbE-LAN PHY client signal, it is possible to accommodate and transfer the 10 GbE-LAN PHY signal using an OTU2e frame. However, with the spread of the broadband Internet, in the WDM system of the 10 Gb/s class, the capacity is not sufficient, and there is a need for a system of a 40 Gb/s class. The WDM system of the 40 Gb/s class also requires a function of accommodating and multiplexing 4 OTU2e signals of a 10 Gb/s class and then outputting the OTU2e signals as a 40 G signal. Even in the OTN, an international standard on quadruple multiplexing of a 10 G signal exists, but since a degree of bit rate accuracy is assumed as ±20 ppm, there is a problem in that it is difficult to accommodate, with multiplexing, an ODU2e in an OTUe2 frame having a degree of accuracy of ±100 ppm as described above.

In light of the foregoing, it is an object of the present invention to provide an optical digital transmission system, a transmission device, and a reception device, which are capable of multiplexing a client signal having a lower degree of bit rate accuracy in the optical digital transmission system that transmits the client signal as an OTU frame.

Means for Solving the Problem

The present invention provides an optical digital transmission system that accommodates a plurality of client signals with multiplexing, and transmits the client signals as an optical channel transport unit (OTU) frame. The optical digital transmission system newly defines one second negative stuff byte in an overhead area for accommodation of the client signals with multiplexing into the OTU frame, newly defines one third positive stuff byte in a corresponding tributary slot in a payload area for accommodation of client signals with multiplexing, newly defines stuff control bits that is used for decision of the use of the second negative stuff byte and the third positive stuff byte in three different places in the overhead area for client signal accommodation with multiplexing, performs control by using the newly defined stuff control bits when accommodation of the client signal with the third positive stuff byte or the second negative stuff byte is required, and performs stuff control without using the newly defined stuff control bits when accommodation of the client signal by the third positive stuff byte and the second negative stuff byte is not required.

According to an optical digital transmission system of the present invention, it is preferable for the second negative stuff byte to be disposed in a third row and a sixteenth column of the OTU frame, the stuff control bits in the three places to be dispersedly disposed in a first row and a second row of the sixteenth column of the OTU frame, and the third positive stuff byte to be disposed in a row directly above a first positive stuff byte in a corresponding tributary slot.

According to an optical digital transmission system of the present invention, it is preferable for the second negative stuff byte to be disposed in a third row and a fifteenth column of the OTU frame, the stuff control bits in the three places to be dispersedly disposed in a first row to a third row of a sixteenth column of the OTU frame, and the third positive stuff byte to be disposed in a row directly above a first positive stuff byte in a corresponding tributary slot.

According to an optical digital transmission system of the present invention, it is preferable for a transmission bit rate of the OTU frame to rise from 43.08 Gb/s to 44.57 Gb/s, and the client signal to be accommodated with multiplexing to be an optical channel data unit (ODU)2e (10.399 Gb/s±100 ppm).

According to the present invention, a transmission bit rate of the OTU frame rises from 43.08 Gb/s to 44.38 Gb/s, and the client signal to be accommodated with multiplexing is an ODU1e (10.355 Gb/s±100 ppm).

According to an optical digital transmission system of the present invention, it is preferable for the multiplexed client signal to be a 10 GbE-LAN (10.3125 Gb/s±100 ppm), and a transmission bit rate of the OTU frame to rise to 44.57 Gb/s.

According to an optical digital transmission system of the present invention, it is preferable for the multiplexed client signal to be a 10 GbE-LAN (10.3125 Gb/s±100 ppm), and a transmission bit rate of the OTU frame to rise to 44.38 Gb/s.

The present invention provides a transmission device in an optical digital transmission system that accommodates a plurality of client signals with multiplexing, and transmits the client signals as an OTU frame. The transmission device newly defines one second negative stuff byte in an overhead area for accommodation of the client signals with multiplexing into the OTU frame, newly defines one third positive stuff byte in a corresponding tributary slot in a payload area for accommodation of client signals with multiplexing, newly defines stuff control bits that is used for decision of the use of the second negative stuff byte and the third positive stuff byte in three different places in the overhead area for client signal accommodation with multiplexing, performs control by using the newly defined stuff control bits when accommodation of the client signal with the third positive stuff byte or the second negative stuff byte is required, and performs stuff control without using the newly defined stuff control bits when accommodation of the client signal by the third positive stuff byte and the second negative stuff byte is not required.

The present invention provides a reception device in an optical digital transmission system that accommodates a plurality of client signals with multiplexing, and transmits the client signals as an OTU frame. The reception device newly defines one second negative stuff byte in an overhead area for accommodation of the client signals with multiplexing into the OTU frame, newly defines one third positive stuff byte in a corresponding tributary slot in a payload area for accommodation of client signals with multiplexing, newly defines stuff control bits that is used for decision of the use of the second negative stuff byte and the third positive stuff byte in three different places in the overhead area for client signal accommodation with multiplexing, performs control by using the newly defined stuff control bits when accommodation of the client signal with the third positive stuff byte or the second negative stuff byte is required, and performs stuff control without using the newly defined stuff control bits when accommodation of the client signal by the third positive stuff byte and the second negative stuff byte is not required.

Effect of the Invention

According to the present invention, in an optical digital transmission system that multiplexes a plurality of client signals and transmits the client signals as an OTU frame, transmission is performed using the OTU frame in which a negative stuff byte, a positive stuff byte, and a stuff control bit are added. Thus, there is an effect of enabling accommodation of an ODU2e client signal with multiplexing having a degree of clock accuracy of ±100 ppm. Further, an effect of enabling compatibility with a signal having a degree of clock accuracy of ±20 ppm to be maintained can be obtained.

BRIEF DESCRIPTION OF THE DRAWINGS

FIG. 7 is an explanation view illustrating an OTU frame configuration.

FIG. 9 is an explanation view illustrating a concrete example of a process of JC1/JC2, NJO1/NJO2, and PJO1/PJO2/PJO3.

FIG. 13 is an explanation view illustrating a use example of JC, NJO, PJO1, and PJO2.

EMBODIMENTS FOR CARRYING OUT THE INVENTION

Figure 1:
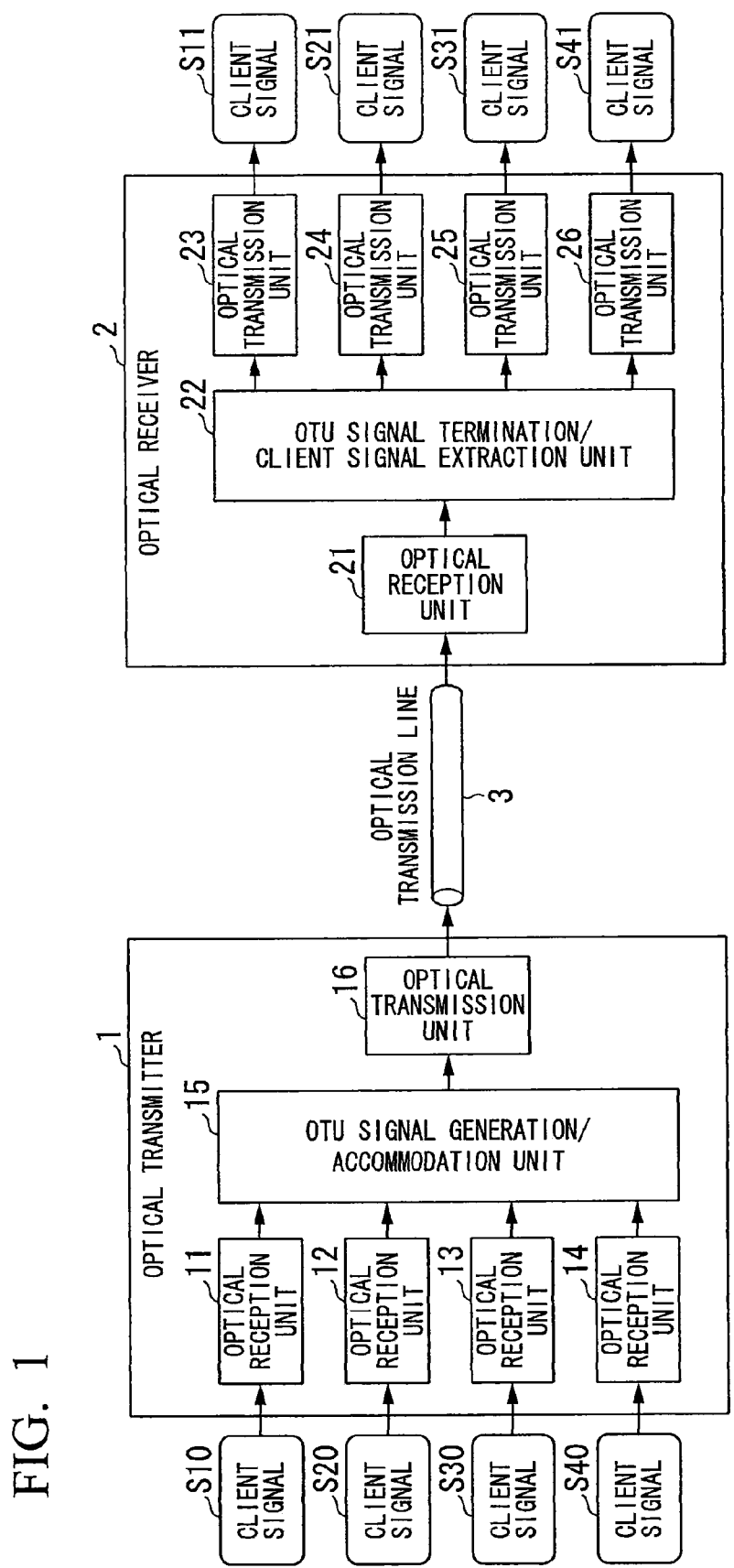
FIG. 1 is a block diagram illustrating a configuration of an embodiment of the present invention.

Hereinafter, an optical digital transmission system according to an embodiment of the present invention will be described with reference to the accompanying drawings. FIG. 1 is a block diagram illustrating a configuration of the same embodiment. In FIG. 1, an optical transmitter 1 receives a plurality of client signals S10 to S40, converts the received client signals from optical signals to electrical signals, converts the electrical signals into a frame suitable for optical transmission by multiplexing, converts the frame to an optical signal, and outputs the optical signal to an optical transmission line 3. An optical receiver 2 receives a signal transmitted through the optical transmission line 3, converts an optical signal to an electrical signal, extracts client signals by demultiplexing, and outputs the client signals S11 to S41 as the optical signals.

Optical reception units 11 to 14 convert the received client signals S10 to S40 to the electrical signals and output the electrical signals. An OTU signal generation/accommodation unit 15 receives the output signals from the optical reception units 11 to 14, accommodates the client signals, performs multiplexing, and outputs a signal of an OTU frame suitable for optical transmission. An optical transmission unit 16 converts the signal of the OTU frame to the optical signal and outputs the optical signal to the optical transmission line 3.

An OTU signal termination/client signal extraction unit 21 is an optical reception unit that receives an optical transmission signal of the optical transmission line 3, converts the optical transmission signal to the electrical signal, and outputs the electrical signal. Reference numeral 22 receives the signal output from the optical reception unit 21, terminates the signal of the OTU frame, and extracts the client signals. Optical transmission units 23 to 26 convert the client signals extracted by the OTU signal termination/client signal extraction unit 22 to the optical signals, and output the client signals S11 to S41.

Figure 6:
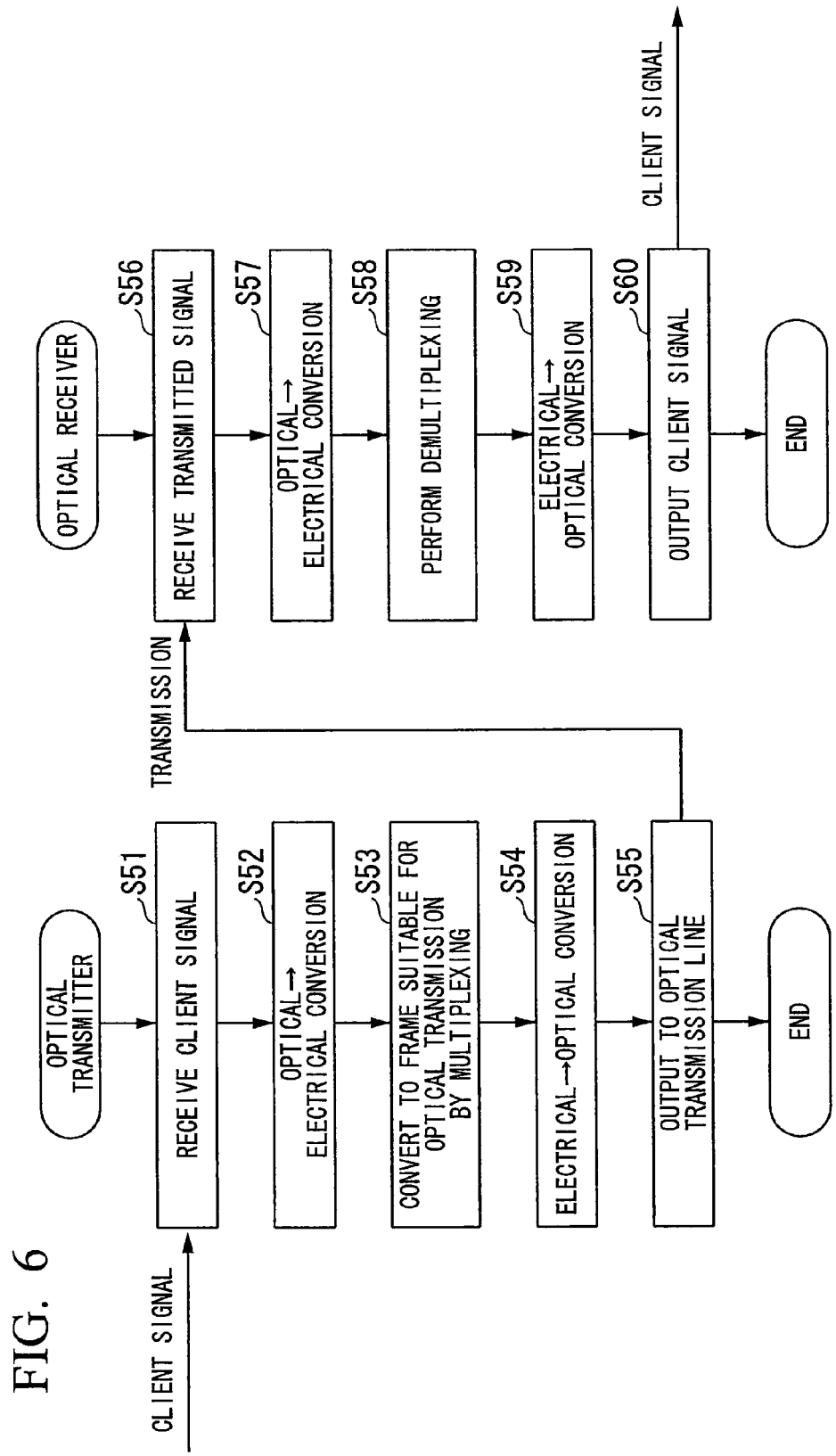
FIG. 6 is a flowchart illustrating an operation of the optical digital transmission system illustrated in FIG. 1.

An operation of the optical digital transmission system illustrated in FIG. 1 will be described with reference to FIG. 6. First, when the plurality of client signals S10 to S40 are input to the optical transmitter 1 (step S51), the optical reception units 11 to 14 convert the input client signals from the optical signals to the electrical signals, respectively (step S52). Subsequently, the OTU signal generation/accommodation unit 15 receives the signals from the optical reception units 11 to 14, accommodates the client signals, performs multiplexing, and outputs the signal of the OTU frame suitable for optical transmission (step S53). The optical transmission unit 16 receives the signal of the OTU frame output from the OTU signal generation/accommodation unit 15 and performs conversion from the electrical signal to the optical signal (step S54). The optical transmission unit 16 outputs the converted optical signal to the optical transmission line 3 (step S55).

Next, the optical reception unit 21 receives the signal transmitted through the optical transmission line 3 (step S56), converts the received optical signal to the electrical signal, and outputs the electrical signal (step S57). Subsequently, the OTU signal termination/client signal extraction unit 22 receives the signal output from the optical reception unit 21, terminates the OTU frame, and performs demultiplexing by extracting the client signals (step S58). The optical transmission units 23 to 26 convert the extracted client signals from the electrical signals to the optical signals (step S59) and output the client signals S11 to S41 (step S60).

Figure 7:
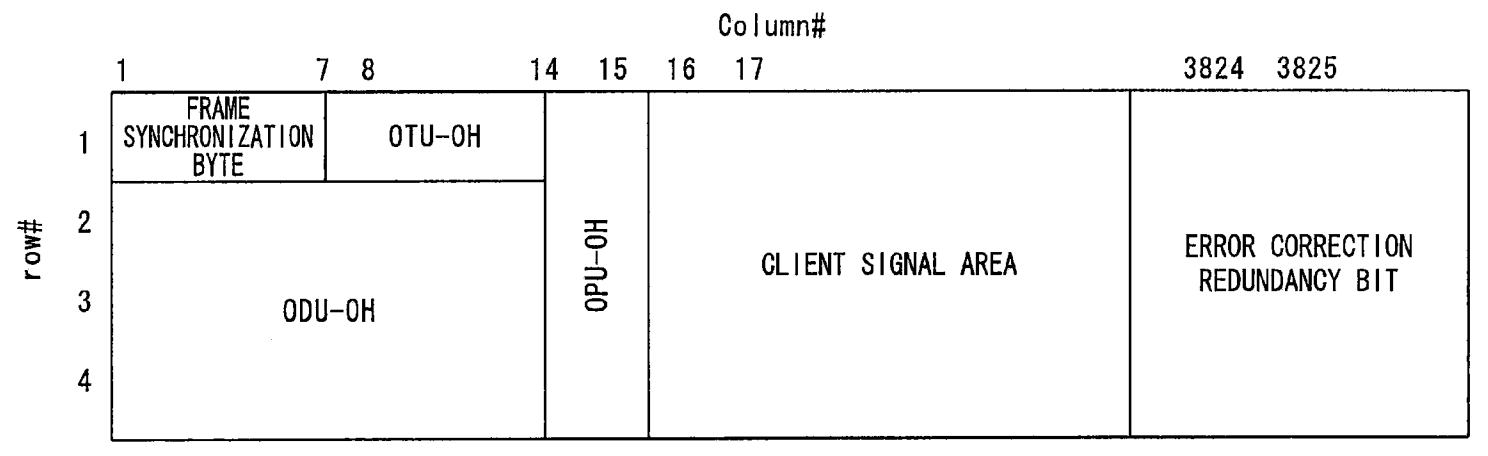

A configuration of a transmission frame (the OTU frame) used in the optical digital transmission system illustrated in FIG. 1 will be described with reference to FIG. 7. The OTU frame includes a frame synchronization byte for acquiring frame synchronization, an OTU-overhead (OH) for performing an operation as a network, an ODU-OH, an error correction byte for performing long-distance transmission, and an OPU area as a payload. The client signal is accommodated in the payload area of the OPU. In the case of using a 10 GbE signal as a client or in the case of transparently signal-accommodating an ODU2e signal of an OTU2e signal as a payload, a bit rate as an OTU3 is 43.018 Gb/s in the typical G.709 standard. However, accommodation becomes possible by shortening a frame period without changing a frame structure, and so the bit rate becomes 44.57 Gb/s. Here, an OTU3 frame in which the frame period is shortened is referred to as an OTU3e.

Figure 2:
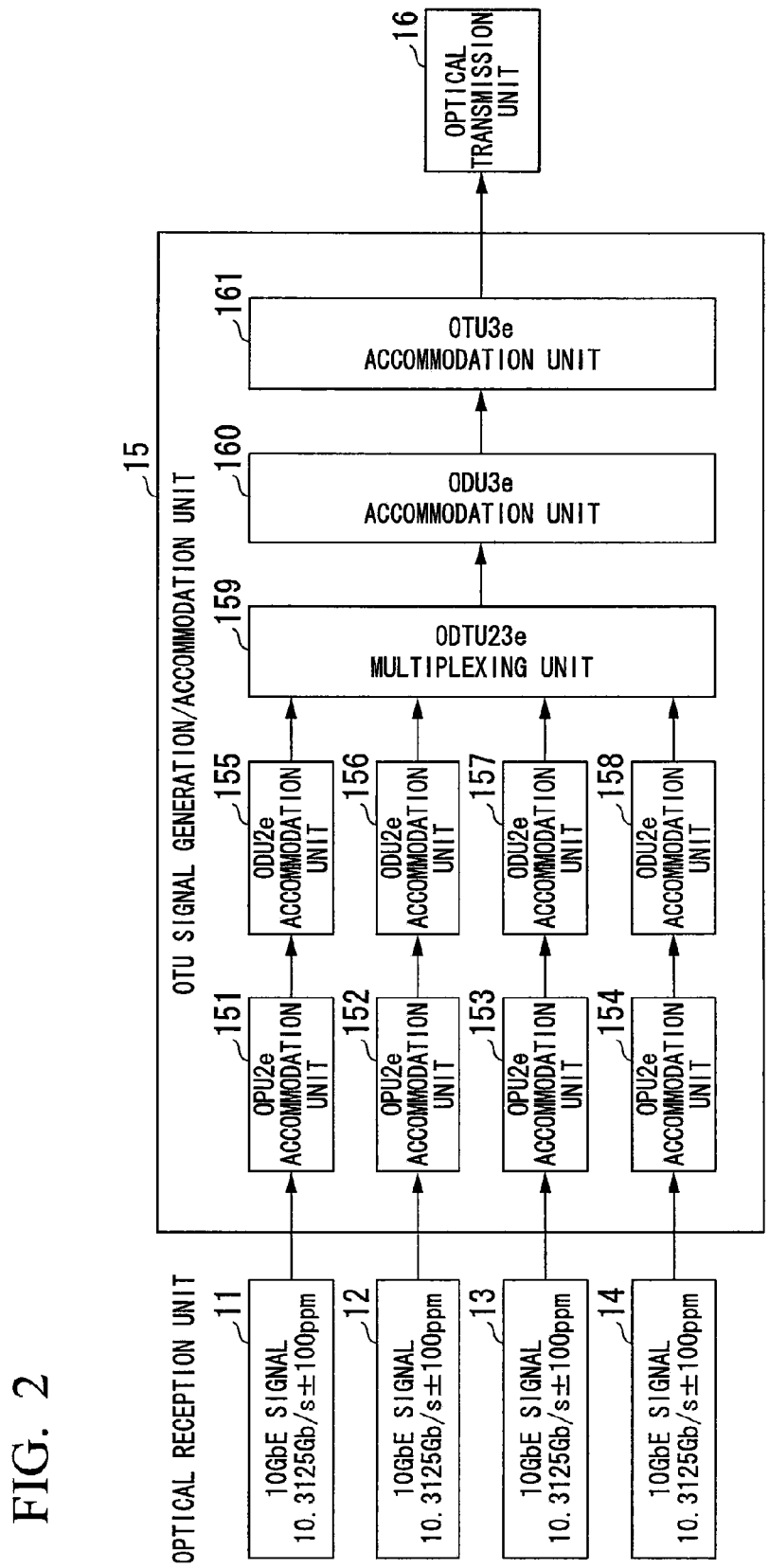
FIG. 2 is a block diagram illustrating a configuration of an OTU signal generation/accommodation unit 15 illustrated in FIG. 1 (a case in which a client signal is a 10 GbE signal).

Next, a detailed configuration of the OTU signal generation/accommodation unit 15 illustrated in FIG. 1 will be described with reference to FIG. 2 in connection with a case in which the client signal is a 10 GbE. The 10 GbE signals (10.3125 Gb/s±100 ppm) received in the optical reception units 11 to 14 are accommodated in an OPU2e by OPU2e accommodation units 151 to 154, respectively. Then, the signals are accommodated in an ODU2e by ODU2e accommodation units 155 to 158, quadruple-multiplexed by an ODTU23e accommodation unit 159, and accommodated in an ODU3e accommodation unit 160. Next, the signals are accommodated in an OTU3e frame by an OTU3e accommodation unit 161 and output to the optical transmission unit 16. Here, a suffix "e" represents that the frame period is shortened for 10 GbE compared to the OTU, the ODU, and the OPU generally defined in the G.709.

Figure 3:
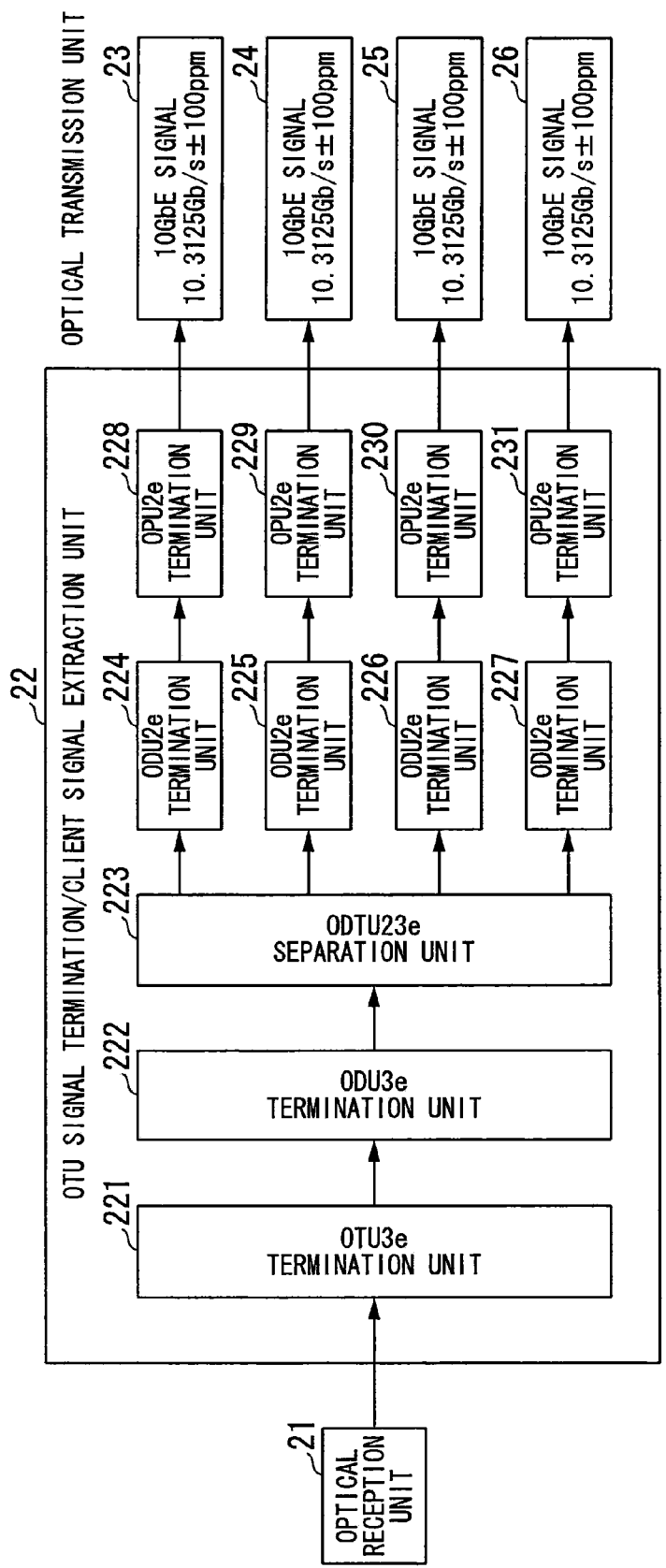
FIG. 3 is a block diagram illustrating a configuration of an OTU signal termination/client signal extraction unit 22 illustrated in FIG. 1 (a case in which a client signal is a 10 GbE signal).

Next, a detailed configuration of the OTU signal termination/client signal extraction unit 22 illustrated in FIG. 1 will be described with reference to FIG. 3 in connection with a case in which the client signal is the 10 GbE. When the OTU3e frame output from the optical reception unit 21 is received, an OTU3e termination unit 221 performs extraction of the OTU-OH, an error correction process, and an error correction bit termination process. Thereafter, an ODU3e termination unit 222 extracts an ODU-OH, and an ODTU23e separation unit 223 performs a separation process on a payload portion of the ODU3e, and outputs 4 ODU2e signals. ODU2e termination units 224 to 227 extract the ODU-OH. OPU2e termination units 228 to 231 extract the OPU-OH and output the 10 GbE signals that are the client signals to the optical transmission units 23 to 26.

Figure 4:
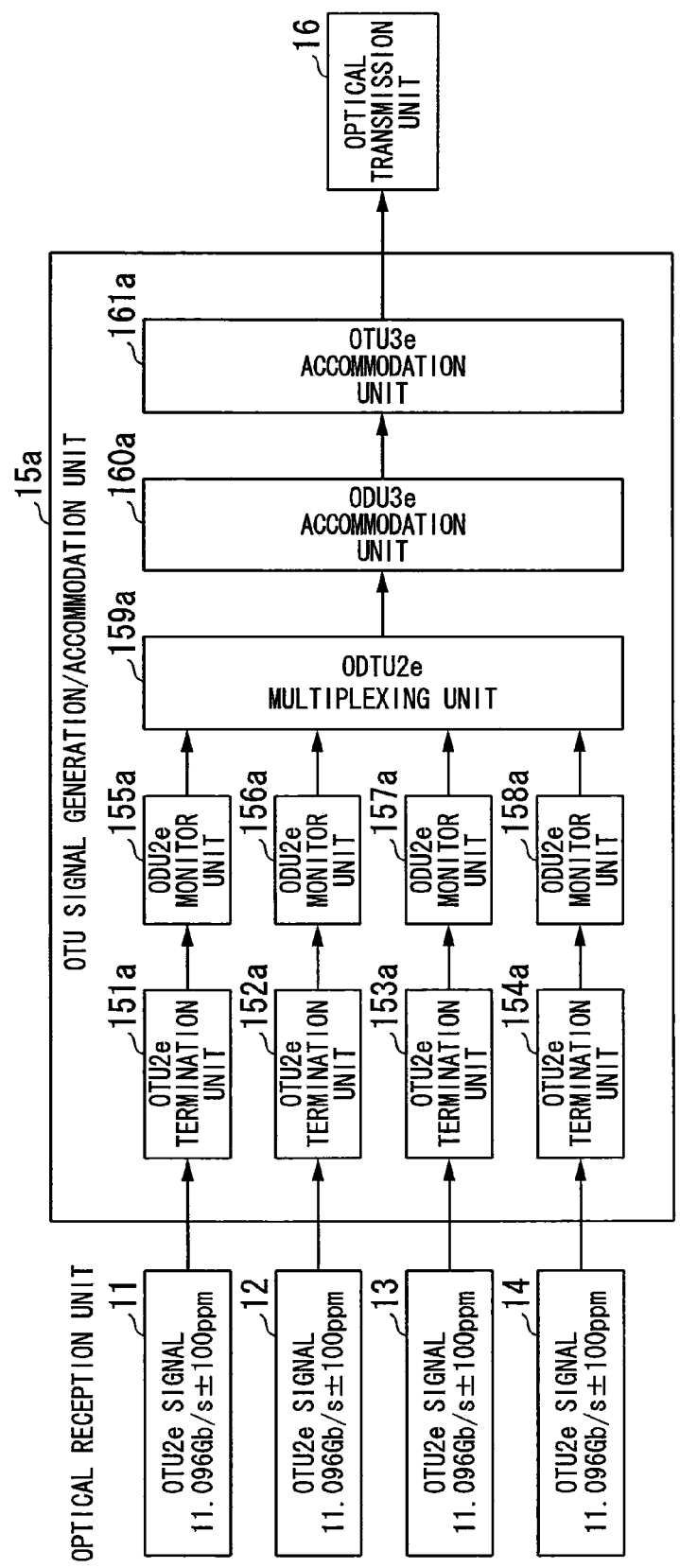
FIG. 4 is a block diagram illustrating a configuration of the OTU signal generation/accommodation unit 15a illustrated in FIG. 1 (a case in which a client signal is an ODU2e signal).

Next, a detailed configuration of the OTU signal generation/accommodation unit 15 illustrated in FIG. 1 will be described with reference to FIG. 4 in connection with a case in which the client signal is the ODU2e signal of the OTU2e signal. ODU2e signals are extracted from OTU2e signals received in the optical reception units 11 to 14 by OTU-OH termination processes of OTU2e termination units 151a to 154a, respectively. Thereafter, the signals are accommodated in an ODU2e by ODU2e monitor units 155a to 158a, quadruple-multiplexed by an ODTU23e accommodation unit 159a, and accommodated in an ODU3e accommodation unit 160a. The signals are accommodated in a signal of an OTU3e frame by an OTU3e accommodation unit 161a and output to the optical transmission unit 16.

Figure 5:
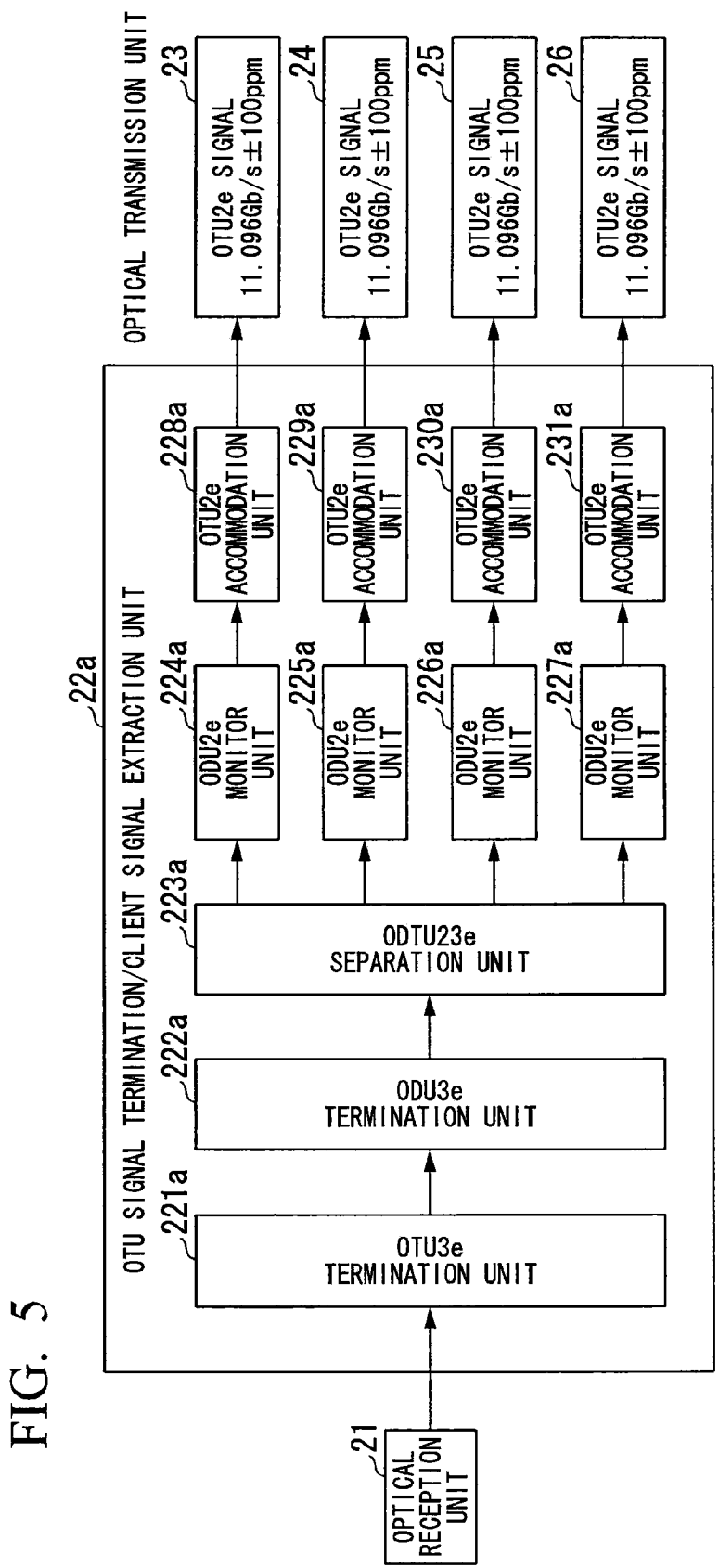
FIG. 5 is a block diagram illustrating a configuration of the OTU signal termination/client signal extraction unit 22a illustrated in FIG. 1 (a case in which a client signal is an ODU2e signal).

Next, a detailed configuration of the OTU signal termination/client signal extraction unit 22 illustrated in FIG. 1 will be described with reference to FIG. 5 in connection with a case in which the client signal is the ODU2e signal of the OTU2e signal. When the OTU3e frame output from the optical reception unit 21 is received, an OTU3e termination unit 221 performs extraction of the OTU-OH, an error correction process, and an error correction bit termination process. Thereafter, an ODU3e termination unit 222 extracts the ODU-OH, and an ODTU23e separation unit 223 performs a separation process on a payload portion of the ODU3e and outputs 4 ODU2e signals. ODU2e monitor units 224a to 227a perform quality monitoring on the ODU2e signals. OTU2e accommodation units 228a to 231a perform accommodation into the OTU2e frame again and output the OTU2e signals.

Figure 8:
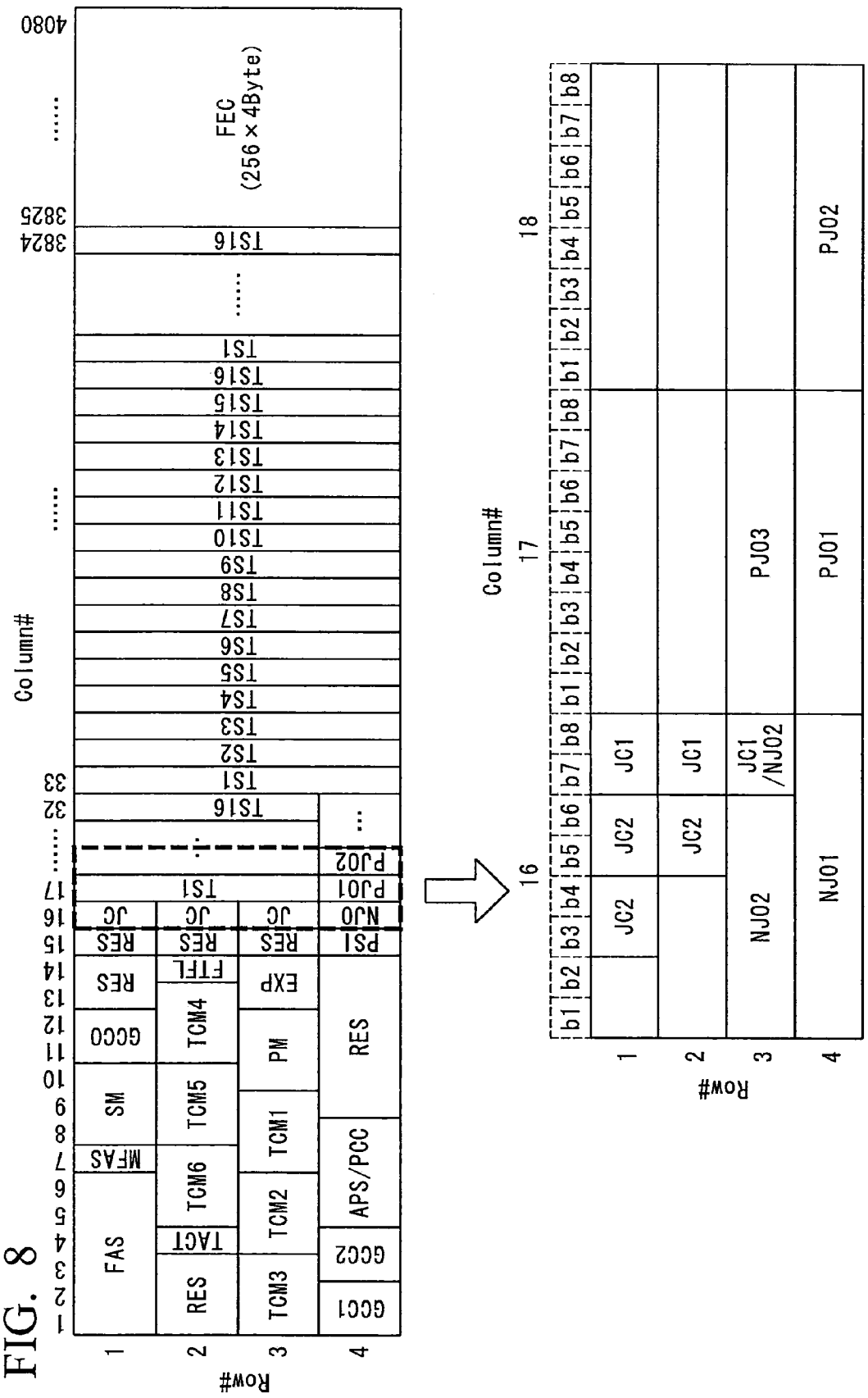
FIG. 8 is an explanation view illustrating a concrete frame use example according to a first embodiment of the present invention.

Next, a frame of a multiplexing process of the OTU signal generation/accommodation unit 15 illustrated in FIG. 1 will be described using a concrete example with reference to FIGS. 8 and 9. The frame configuration is the same as defined in the G.709 except for columns 16 to 18. As a bit rate for multiplexing 4 ODU2es, it is necessary to increase the bit rate from 43.08 Gb/s of the OTU3 defined in the G.709 to 44.57 Gb/s (=10.3125 Gb/s×4×255/236). A third row of the column 16 may be used for a second negative stuff byte, and a third row of the column 17 may also be used for a third positive stuff byte. By defining 2 negative stuff bytes and 3 positive stuff bytes, a signal having a deviation from −161 ppm to +166 ppm can be accommodated.

As an ODU2e client signal, a signal having a degree of clock accuracy from −176 ppm to +111 ppm can be accommodated. Since a degree of clock accuracy of the ODU2e is ±100 ppm, the ODU2e can be accommodated by extending each of the negative stuff and the positive stuff by one byte. At the same time, even on the stuff control bit, as illustrated in FIG. 8, a JC2 bit is newly defined in a bit 3 and a bit 4 of a first row of the column 16, a bit 5 and a bit 6 of the first row of the column 16, and a bit 5 and a bit 6 of a second row of the column 16, and so a JC process is extended. As illustrated in FIG. 9, stuff control can be performed by giving the meaning of "double negative stuff" in the case in which the two bits of the JC2 are "01" and similarly the meaning of "triple positive stuff" in the case of "11".

Further, by setting the JC2 at three places, the stuff control can be performed by a majority voting logic. On the JC1, the position of the JC bit defined in the G.709 is maintained, and the meaning thereof is also the same. Thus, it is possible to cope with accommodation of the ODU2e client having a degree of accuracy of ±100 ppm while maintaining compatibility with the existing stuff control in the G.709. The JC2 may be concentratedly disposed in the bit 1 to the bit 6 of the column 16. In this case, the third positive stuff can be disposed in a first row, a second row, or a third row of the column 17. Further, even when the JC2 is concentratedly disposed in the bit 1 to the bit 6 of the second row of the column 16, the third positive stuff can be disposed in the second row or the third row of the column 17. In the case of using the above frame structure, since Reserved bytes for future international standardization (RES) in a column 15 defined in the G.709 is not extended, it is possible to cope even with a virtual concatenation. In FIG. 8, the position of PJOx (x=1, 2, and 3) changes by the MultiFrame Alignment Signal (MFAS) and the TS.

Figure 10:
FIG. 10 is an explanation view illustrating a concrete frame use example according to a second embodiment of the present invention.
Figure 11:
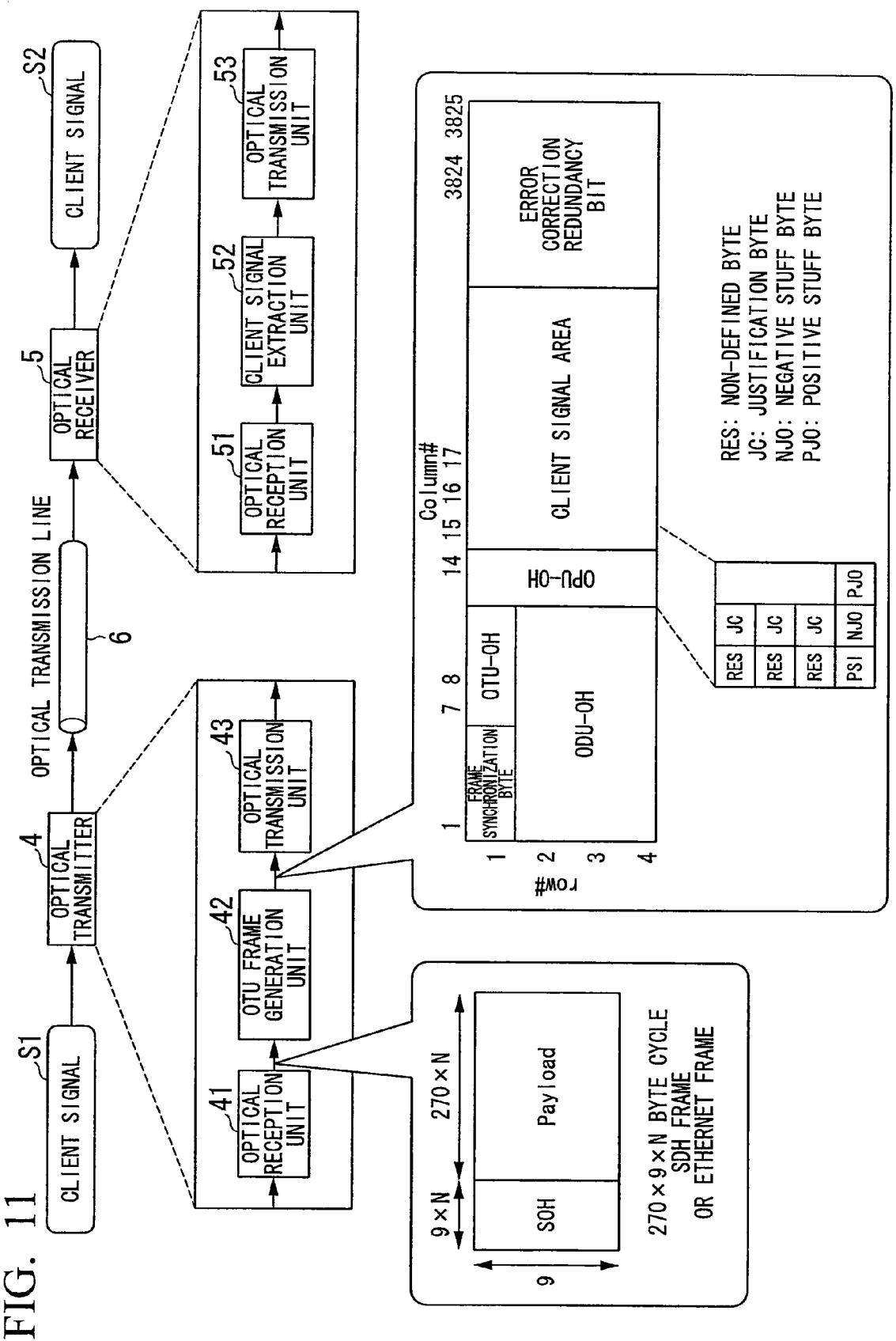
FIG. 11 is a block diagram illustrating a configuration of a transmission system according to conventional art.
Figure 12:
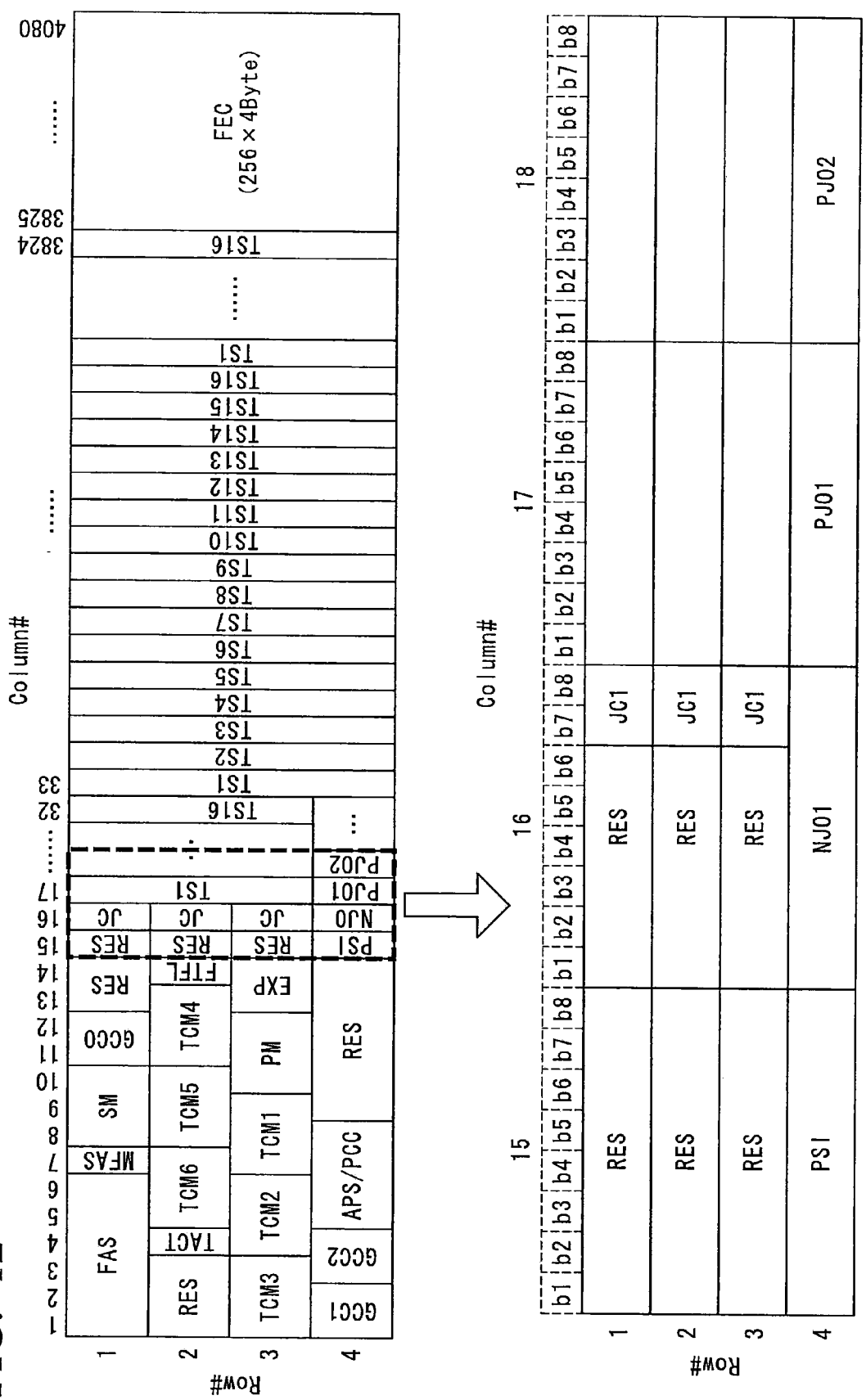
FIG. 12 an explanation view illustrating an ODTU multiplexing frame configuration defined in ITU-T G.709.

Next, a modified example of the frame of the multiplexing process of the OTU signal generation/accommodation unit 15 illustrated in FIG. 1 will be described using a concrete example with reference to FIG. 10. The position of the second stuff control bit JC2 bit and the position of the second negative stuff byte NJO2 (column 15) are different from the frame structure illustrated in FIG. 8. In this case, since the JC2 bits can be disposed in different rows, there is an effect of increasing a bearing force when a burst error occurs. In the modified example, the JC2 is set in a bit 5 and a bit 6 of a first row to a third row of a column 16 but may be set in a bit 1 and a bit 2 or a bit 3 and a bit 4. Further, the position of the third positive stuff byte PJO3 byte may be any position other than a third row of a column 17. In FIG. 10, the position of PJOx changes by the MFAS and the TS.

The above description has been made in connection with the example of quadruple multiplex-accommodating the ODU2e. However, by extending the positive stuff and the negative stuff by one bit and the stuff control bit only by changing the bit rate, an ODU1e can be accommodated with quadruple multiplexing in a similar manner. At the same time, it is possible to maintain compatibility with the conventional case of accommodating only the client of ±20 ppm. In this case, the bit rate as the OTU3 in which the period is shortened is 44.38 Gb/s.

INDUSTRIAL APPLICABILITY

The present invention can be applied to an optical digital transmission system that multiplexes a plurality of client signals and transmits the client signals as an OTU frame. In the present invention, since transmission is performed using the OTU frame in which a negative stuff byte, a positive stuff byte, and a stuff control bit are added, an ODU2e client signal having a degree of clock accuracy of ±100 ppm can be accommodated with multiplexing. Further, it is possible to maintain compatibility with a signal having a degree of clock accuracy of ±20 ppm.

REFERENCE SYMBOLS

1: Optical transmitter
11 to 14: Optical reception unit
15: OTU signal generation/accommodation unit
16: Optical transmission unit
2: Optical receiver
21: Optical reception unit
22: OTU signal termination/client signal extraction unit
23 to 26: Optical transmission unit
3: Optical transmission line

The invention claimed is:

1. An optical digital transmission system that accommodates a plurality of client signals with multiplexing, and transmits the client signals as an optical channel transport unit (OTU) frame,
wherein the optical digital transmission system newly defines one second negative stuff byte in an overhead area for accommodation of the client signals with multiplexing into the OTU frame, newly defines one third positive stuff byte in a corresponding tributary slot in a payload area for accommodation of client signals with multiplexing, newly defines stuff control bits that is used for decision of the use of the second negative stuff byte and the third positive stuff byte in three different places in the overhead area for client signal accommodation with multiplexing, performs control by using the newly defined stuff control bits when accommodation of the client signal with the third positive stuff byte or the second negative stuff byte is required, and performs stuff control without using the newly defined stuff control bits when accommodation of the client signal by the third positive stuff byte and the second negative stuff byte is not required,
wherein the second negative stuff byte is disposed in a third row and a sixteenth column of the OTU frame, the stuff control bits in the three places are dispersedly disposed in a first row and a second row of the sixteenth column of the OTU frame, and the third positive stuff byte is disposed in a row directly above a first positive stuff byte in a corresponding tributary slot.

2. The optical digital transmission system according to claim 1, wherein a transmission bit rate of the OUT frame rises from 43.08 Gb/s to 44.57 Gb/s, and the client signal to be accommodated with multiplexing is an optical channel data unit (ODU)2e (10.399 Gb/s±100 ppm).

3. The optical digital transmission system according to claim 1, wherein a transmission bit rate of the OUT frame rises from 43.08 Gb/s to 44.38 Gb/s, and the client signal to be accommodated with multiplexing is an ODU1e (10.355 Gb/s±100 ppm).

4. The optical digital transmission system according to claim 1, wherein the multiplexed client signal is a 10 GbE-LAN (10.3125 Gb/s±100 ppm), and a transmission bit rate of the OUT frame rises to 44.57 Gb/s.

5. The optical digital transmission system according to claim 1, wherein the multiplexed client signal is a 10 GbE-LAN (10.3125 Gb/s±100 ppm), and a transmission bit rate of the OUT frame rises to 44.38 Gb/s.

6. An optical digital transmission system that accommodates a plurality of client signals with multiplexing, and transmits the client signals as an optical channel transport unit (OTU) frame,
wherein the optical digital transmission system newly defines one second negative stuff byte in an overhead area for accommodation of the client signals with multiplexing into the OTU frame, newly defines one third positive stuff byte in a corresponding tributary slot in a payload area for accommodation of client signals with multiplexing, newly defines stuff control bits that is used for decision of the use of the second negative stuff byte and the third positive stuff byte in three different places in the overhead area for client signal accommodation with multiplexing, performs control by using the newly defined stuff control bits when accommodation of the client signal with the third positive stuff byte or the second negative stuff byte is required, and performs stuff control without using the newly defined stuff control bits when accommodation of the client signal by the third positive stuff byte and the second negative stuff byte is not required,
wherein the second negative stuff byte is disposed in a third row and a fifteenth column of the OTU frame, the stuff control bits in the three places are dispersedly disposed in a first row to a third row of a sixteenth column of the OTU frame, and the third positive stuff byte is disposed in a row directly above a first positive stuff byte in a corresponding tributary slot.

7. The optical digital transmission system according to claim 6, wherein a transmission bit rate of the OTU frame rises from 43.08 Gb/s to 44.57 Gb/s, and the client signal to be accommodated with multiplexing is an optical channel data unit (ODU)2e (10.399 Gb/s±100 ppm).

8. The optical digital transmission system according to claim 6, wherein a transmission bit rate of the OTU frame rises from 43.08 Gb/s to 44.38 Gb/s, and the client signal to be accommodated with multiplexing is an ODU1e (10.355 Gb/s±100 ppm).

9. The optical digital transmission system according to claim 6, wherein the multiplexed client signal is a 10 GbE-LAN (10.3125 Gb/s±100 ppm), and a transmission bit rate of the OTU frame rises to 44.57 Gb/s.

10. The optical digital transmission system according to claim 6, wherein the multiplexed client signal is a 10 GbE-LAN (10.3125 Gb/s±100 ppm), and a transmission bit rate of the OTU frame rises to 44.38 Gb/s.

11. A transmission device in an optical digital transmission system that accommodates a plurality of client signals with multiplexing, and transmits the client signals as an optical channel transport unit (OTU) frame,
wherein the transmission device newly defines one second negative stuff byte in an overhead area for accommodation of the client signals with multiplexing into the OTU frame, newly defines one third positive stuff byte in a corresponding tributary slot in a payload area for accommodation of client signals with multiplexing, newly defines stuff control bits that is used for decision of the use of the second negative stuff byte and the third positive stuff byte in three different places in the overhead area for client signal accommodation with multiplexing, performs control by using the newly defined stuff control bits when accommodation of the client signal with the third positive stuff byte or the second negative stuff byte is required, and performs stuff control without using the newly defined stuff control bits when accommodation of the client signal by the third positive stuff byte and the second negative stuff byte is not required, wherein the second negative stuff byte is disposed in a third row and a sixteenth column of the OTU frame, the stuff control bits in the three places are dispersedly disposed in a first row and a second row of the sixteenth column of the OTU frame, and the third positive stuff byte is disposed in a row directly above a first positive stuff byte in a corresponding tributary slot.

12. A reception device in an optical digital transmission system that accommodates a plurality of client signals with multiplexing, and transmits the client signals as an optical channel transport unit (OTU) frame, wherein the reception device newly defines one second negative stuff byte in an overhead area for accommodation of the client signals with multiplexing into the OTU frame, newly defines one third positive stuff byte in a corresponding tributary slot in a payload area for accommodation of client signals with multiplexing, newly defines stuff control bits that is used for decision of the use of the second negative stuff byte and the third positive stuff byte in three different places in the overhead area for client signal accommodation with multiplexing, performs control by using the newly defined stuff control bits when accommodation of the client signal with the third positive stuff byte or the second negative stuff byte is required, and performs stuff control without using the newly defined stuff control bits when accommodation of the client signal by the third positive stuff byte and the second negative stuff byte is not required, wherein the second negative stuff byte is disposed in a third row and a sixteenth column of the OTU frame, the stuff control bits in the three places are dispersedly disposed in a first row and a second row of the sixteenth column of the OTU frame, and the third positive stuff byte is disposed in a row directly above a first positive stuff byte in a corresponding tributary slot.

13. A transmission device in an optical digital transmission system that accommodates a plurality of client signals with multiplexing, and transmits the client signals as an optical channel transport unit (OTU) frame, wherein the transmission device newly defines one second negative stuff byte in an overhead area for accommodation of the client signals with multiplexing into the OTU frame, newly defines one third positive stuff byte in a corresponding tributary slot in a payload area for accommodation of client signals with multiplexing, newly defines stuff control bits that is used for decision of the use of the second negative stuff byte and the third positive stuff byte in three different places in the overhead area for client signal accommodation with multiplexing, performs control by using the newly defined stuff control bits when accommodation of the client signal with the third positive stuff byte or the second negative stuff byte is required, and performs stuff control without using the newly defined stuff control bits when accommodation of the client signal by the third positive stuff byte and the second negative stuff byte is not required, wherein the second negative stuff byte is disposed in a third row and a fifteenth column of the OTU frame, the stuff control bits in the three places are dispersedly disposed in a first row to a third row of a sixteenth column of the OTU frame, and the third positive stuff byte is disposed in a row directly above a first positive stuff byte in a corresponding tributary slot.

14. A reception device in an optical digital transmission system that accommodates a plurality of client signals with multiplexing, and transmits the client signals as an optical channel transport unit (OTU) frame, wherein the reception device newly defines one second negative stuff byte in an overhead area for accommodation of the client signals with multiplexing into the OTU frame, newly defines one third positive stuff byte in a corresponding tributary slot in a payload area for accommodation of client signals with multiplexing, newly defines stuff control bits that is used for decision of the use of the second negative stuff byte and the third positive stuff byte in three different places in the overhead area for client signal accommodation with multiplexing, performs control by using the newly defined stuff control bits when accommodation of the client signal with the third positive stuff byte or the second negative stuff byte is required, and performs stuff control without using the newly defined stuff control bits when accommodation of the client signal by the third positive stuff byte and the second negative stuff byte is not required, wherein the second negative stuff byte is disposed in a third row and a fifteenth column of the OTU frame, the stuff control bits in the three places are dispersedly disposed in a first row to a third row of a sixteenth column of the OTU frame, and the third positive stuff byte is disposed in a row directly above a first positive stuff byte in a corresponding tributary slot.

* * * * *